(12) United States Patent
Chang et al.

(10) Patent No.: US 11,662,811 B2
(45) Date of Patent: May 30, 2023

(54) HOLOGRAPHIC DISPLAY SYSTEM

(71) Applicant: GM GLOBAL TECHNOLOGY OPERATIONS LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/400,075

(22) Filed: Aug. 11, 2021

(65) Prior Publication Data

US 2023/0051631 A1 Feb. 16, 2023

(51) Int. Cl.
| | | |
|---|---|---|
| *G02B 27/01* | (2006.01) | |
| *B60K 35/00* | (2006.01) | |
| *G06F 3/01* | (2006.01) | |
| *H04N 7/18* | (2006.01) | |
| *H04N 9/31* | (2006.01) | |
| *G02B 27/00* | (2006.01) | |
| *G02F 1/15* | (2019.01) | |
| *B60R 1/00* | (2022.01) | |
| *G03H 1/00* | (2006.01) | |
| *G06V 40/18* | (2022.01) | |

(52) U.S. Cl.
CPC ............. *G06F 3/013* (2013.01); *B60R 1/00* (2013.01); *G02B 27/0093* (2013.01); *G02F 1/15* (2013.01); *G03H 1/0005* (2013.01); *G06V 40/193* (2022.01); *H04N 7/183* (2013.01); *H04N 9/3126* (2013.01); *B60R 2300/10* (2013.01); *B60R 2300/20* (2013.01); *B60R 2300/30* (2013.01); *G02F 2203/02* (2013.01); *G03H 2001/0088* (2013.01)

(58) Field of Classification Search
CPC ........................................................ B60R 1/12
See application file for complete search history.

(56) References Cited

U.S. PATENT DOCUMENTS

| | | | | |
|---|---|---|---|---|
| 2005/0195455 | A1* | 9/2005 | Bruegl | G02B 27/0103 359/13 |
| 2008/0252833 | A1* | 10/2008 | Nieuwkerk | B60R 1/088 349/115 |
| 2012/0113107 | A1* | 5/2012 | Jang | G02B 30/25 345/419 |
| 2014/0208145 | A1* | 7/2014 | Piccolotto | G09G 3/20 713/324 |
| 2016/0209656 | A1* | 7/2016 | Urey | G02F 1/133555 |
| 2016/0349516 | A1* | 12/2016 | Alexander | H04N 9/3161 |
| 2017/0329143 | A1* | 11/2017 | Svarichevsky | G02B 27/0103 |
| 2018/0220081 | A1* | 8/2018 | Lewis | G06T 7/13 |

* cited by examiner

*Primary Examiner* — Nan-Ying Yang
(74) *Attorney, Agent, or Firm* — Cantor Colburn LLP

(57) ABSTRACT

A display system for a vehicle includes a display unit mounted to the vehicle and is selectively operable in a first mode as a holographic display and in a second mode as a mirror. Holographic images may include rear view images obtained from a camera or computer generated graphics. Holographic images are displayed at a virtual image plane behind the display to reduce the operator's eyes accommodation.

20 Claims, 7 Drawing Sheets

HOLOGRAPHIC DISPLAY SYSTEM

INTRODUCTION

Vehicles are often equipped with interior displays that are visually accessed by the operator's eyes. Displays are commonly positioned in the areas of the instrument cluster, the center stack and upper regions of the instrument panel and provide a great degree of messaging flexibility including still and video images and computer generated graphics and symbols. Displays are also positioned in the area of interior windshield mounted rear view mirrors with the display region completely or partially filling regions within the mirror frame. Camera based rear view systems are known for capturing images rearward of the vehicle and displaying the scene images on interior displays including on rear view mirror displays. Rear view mirror displays may also provide real time rear view camera scenes in place of reflected scenes from a mirror thereby providing the vehicle operator with alternative views including wider fields of view than may be available with conventional reflective mirrors.

A vehicle operator's eyes are generally focused forward of a vehicle during operation at distances beyond the front of the vehicle. During operation, an operator may periodically change eye gaze between scenes forward of the vehicle and the interior displays, thus requiring substantial eye focus changes which take time and may cause operator discomfort.

SUMMARY

In one exemplary embodiment, a display system for a vehicle may include a display unit mounted to a vehicle and selectively operable in a first mode as a holographic display and in a second mode as a mirror, and a controller providing an image and a virtual image plane setting to the display unit when the display unit is operating in the first mode as the holographic display, the display unit configured to generate and display a holographic image at the virtual image plane setting based on the provided image, the virtual image plane setting being greater than a distance between an operator's eyes and the display unit.

In addition to one or more of the features described herein, the display system may further include a rear facing camera, wherein the provided image may include an image from the rear facing camera.

In addition to one or more of the features described herein, the provided image may include a computer generated image.

In addition to one or more of the features described herein, only one of the first mode and the second mode is operable at a time.

In addition to one or more of the features described herein, both the first mode and the second mode may be simultaneously operable.

In addition to one or more of the features described herein, the display unit may include a pupil replicator.

In addition to one or more of the features described herein, the display system may further include an eye tracking system including a selectively infrared reflective layer on the pupil replicator.

In addition to one or more of the features described herein, the eye tracking system may determine a position of the operator's eyes and enables operation of the display unit in the first mode as the holographic display when the operator's eyes are within an eyebox.

In addition to one or more of the features described herein, the display system may further include a mirror behind the pupil replicator.

In addition to one or more of the features described herein, the mirror may include a reversible electrochromic mirror.

In addition to one or more of the features described herein, the display system may further include a controllable absorptive shutter between the pupil replicator and the mirror.

In addition to one or more of the features described herein, the virtual image plane setting may be adaptively set based upon a dilation of an operator's eyes.

In addition to one or more of the features described herein, the virtual image plane setting is no less than 1 meter.

In another exemplary embodiment, a display system for a vehicle may include a display unit mounted to a vehicle and selectively operable in a first mode as a holographic display and in a second mode as a mirror, the display unit including a pupil replicator, a holographic projector optically coupled to the pupil replicator, and a mirror behind the pupil replicator. The display system may further include a rear facing camera capturing an image, an eye tracking system including a selectively infrared reflective layer on the pupil replicator determining a position of an operator's eyes and enabling operation of the display unit in the first mode as the holographic display when the operator's eyes are within an eyebox, and the holographic projector receiving the image captured by the rear facing camera when the display unit is operating in the first mode as the holographic display, generating a holographic image based on the captured image, coupling the holographic image to the pupil replicator to display the holographic image at a predetermined virtual image plane setting, the virtual image plane setting being greater than a distance between an operator's eyes and the display unit.

In addition to one or more of the features described herein, the mirror may include a reversible electrochromic mirror.

In addition to one or more of the features described herein, the display system may further include a controllable absorptive shutter between the pupil replicator and the mirror.

In addition to one or more of the features described herein, the eye tracking system may determine a dilation of the operator's eyes, and the virtual image plane setting may be adaptively set based upon the dilation.

In yet another exemplary embodiment, a method for displaying information in a vehicle may include providing a display unit mounted to the vehicle and selectively operable in a first mode as a holographic display and in a second mode as a mirror, and when the display unit is operating in the first mode as the holographic display providing an image to the display unit, generating, by the display unit, a holographic image based on the provided image, and displaying, at the display unit, the holographic image at a predetermined virtual plane setting, the virtual image plane setting being greater than a distance between an operator's eyes and the display unit.

In addition to one or more of the features described herein, the method for displaying information in a vehicle may further include enabling the display unit to operate in the first mode as the holographic display when the operator's eyes are detected within an eyebox.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
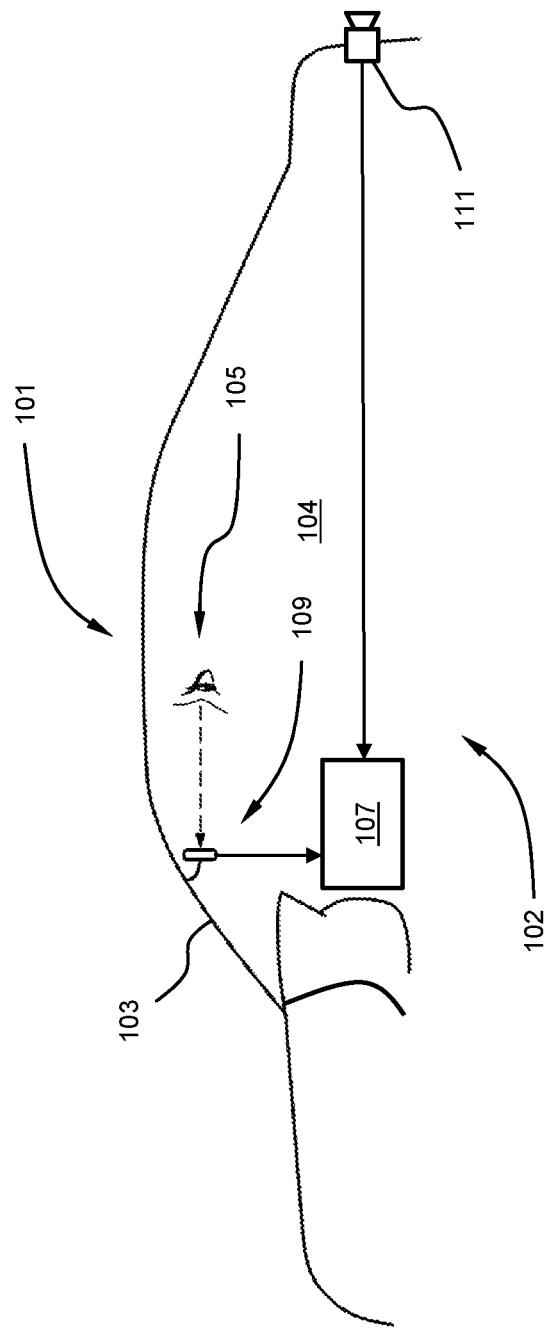
FIG. 1 illustrates an exemplary vehicle including a display system for providing an operator's eyes with visual information, in accordance with the present disclosure.

The following description is merely exemplary in nature and is not intended to limit the present disclosure, its application or uses. Throughout the drawings, corresponding reference numerals indicate like or corresponding parts and features. As used herein, control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle networks (e.g. Controller Area Network (CAN), Local Interconnect Network (LIN) and in-plant and service-related networks). Control module functions as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests FIG. 1 illustrates a vehicle 101 including a display system 102 for providing an operator's eyes 105 with visual information in the operator's forward looking direction from within the passenger compartment 104. The display system 102 may include a display unit 109, a controller 107, and a rear facing (rear view) camera 111. In one embodiment, the camera 111 may include: a still camera, a video camera; a BW and/or a color camera; a wide and/or narrow field-of-view (FOV) camera; and may be part of a mono and/or stereo system of multiple cameras, to cite a few possibilities. The camera may, for example, include a CMOS or CCD device. The camera image data outputted by camera 111 may include raw video or still image data (i.e., with no or little pre-processing), or it may include pre-processed video or still image data in cases where the camera 111 has its own image processing resources and performs pre-processing on the captured images before outputting them as camera image data to the controller 107. In one embodiment, the display unit 109 may be mounted in place of a conventional rear view mirror, for example on the interior of the windshield 103 midway between the vehicle A-pillars and slightly below the headliner. In other embodiments, the display unit may be mounted in an alternative location, for example as a centrally located centerstack display. In one embodiment, the display unit 109 is intended to provide the functionality of a conventional rear view mirror through either display of video reconstructed scenes captured by the rear view camera 111 and processed by the controller 107 or reflected scene information. In alternate embodiments, the display unit 109 may provide other information including rendered graphics and text, for example information such as speed, heading infotainment, navigation cues, etc.

Figure 2:
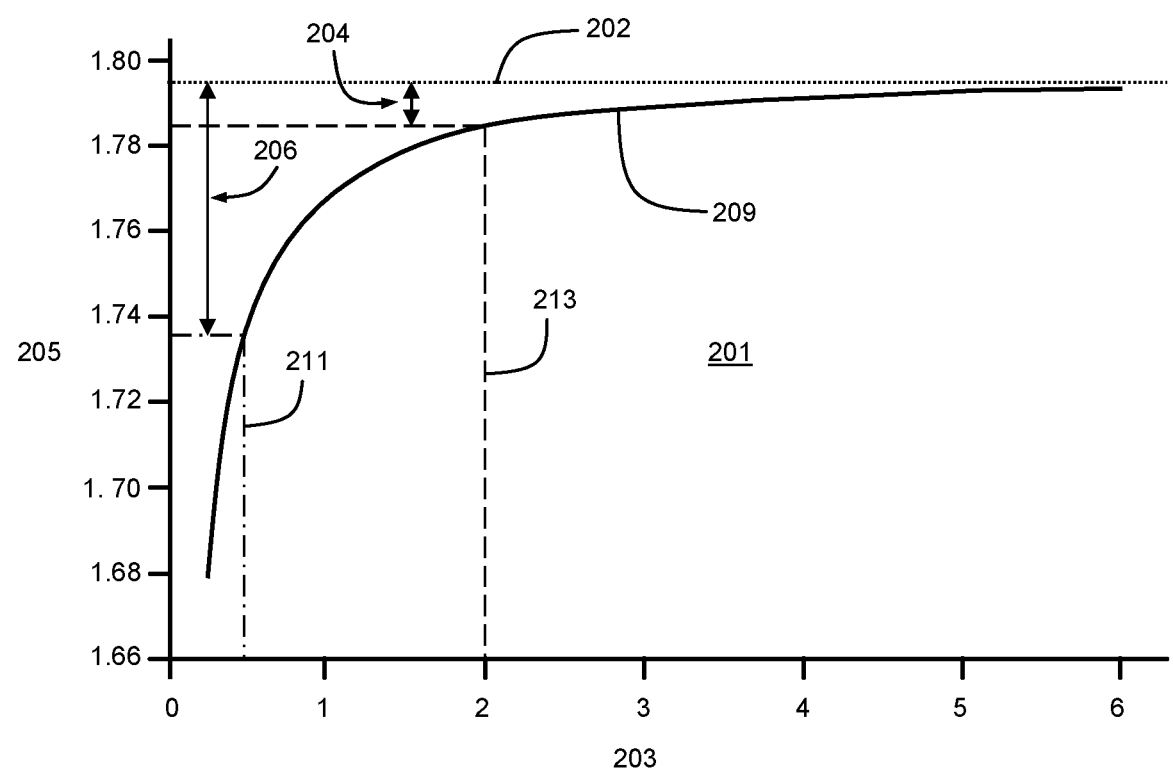
FIG. 2 illustrates a graphical plot of object distance from an operator's eyes versus operator's eyes focal length, in accordance with the present disclosure.

An operator's eyes viewing a scene forward through the windshield are generally focused at or beyond the front extent of the vehicle since that is where forward driving attention is required. Therefore, a vehicle operator's eyes while driving are generally focused well beyond several meters and closer generally only for low speed parking operation where focus may just in front of the vehicle bumper at several meters. Thus, it is understood that an operator's focus forward of the vehicle is generally in excess of a few meters. FIG. 2 illustrates a graphical plot 201 of object or scene distance from an operator's eyes in meters along the horizontal axis 203 versus a typical operator's eyes focal length in centimeters along the vertical axis 205. Focal length of an object at an infinite distance is represented by the dotted line 202 and represents a maximum focal length of an operator's eyes. The relative difference in focal length 204 of an operator's eyes through distances greater than, for example, 2 meters (213) is relatively small. Thus, an operator's eyes require little if any accommodation while viewing scenes forward of the vehicle. However, the relative difference in focal length 206 of an operator's eyes through distances greater than, for example, 0.5 meter (213) is relatively large. A rear view mirror may typically be about 0.5 meters away from an operator's eyes. Thus, an operator's eyes require substantial accommodation when switching between scenes forward of the vehicle and, for example, on interior displays including a rear view mirror. From FIG. 2, it is appreciated that an object at about 1 meter from an operator's eyes would only require about half the total accommodation that an object at about 0.5 meters would require. Large accommodations are generally undesirable since they require more time and may cause operator discomfort. Older operator's eyes may not even be able to accommodate sufficiently to bring into focus interior displays due to natural loss of eye lens elasticity with age. While a rear view mirror is typically within about one-half meter of an operator's eyes, the image reflected by the mirror is well beyond several meters and switching between a forward looking scene and a rear view mirror reflection does not require substantial accommodation. However, images including text, graphics, pictures and video, for example, displayed on conventional displays, including for example LED and similar displays, require an operator's eyes to focus on the images at the distance of the display. Thus, such displays, for example located at conventional rear view mirror placement or in the region of the center stack, require substantial accommodation of the operator's eyes when switching between a forward looking scene or reflected rear view image and the information presented on such a display.

In accordance with the present disclosure, a display system 102 and methods are configured to display holographic images with a display unit 109 to an operator wherein the holographic images are displayed at a virtual image plane that is further from the operator's eyes 105 than the display unit 109. Holographic images are displayed for viewing from a front side of the display. The operator's eyes 105 are therefore referred to as being in front of the display. The holographic image is displayed on the display unit 109 at a virtual image plane that is beyond the physical distance from the operator's eyes 105 to the display unit 109. The virtual image plane is referred to as being behind, in back of or beyond the display unit. As use herein, a holographic image may be based upon any combination of computer generated still or motion graphics or still or motion images based on images captured on a camera. In one embodiment, a display unit 109 in accordance with the present disclosure may, in a holographic mode, display a holographic image and in a reflective mode operate as a reflective mirror. Holographic and mirror mode operations may be mutually exclusive or combinable. That is, any mode may be operable to the exclusion of the other, or both modes may be operable simultaneously.

Figure 3:
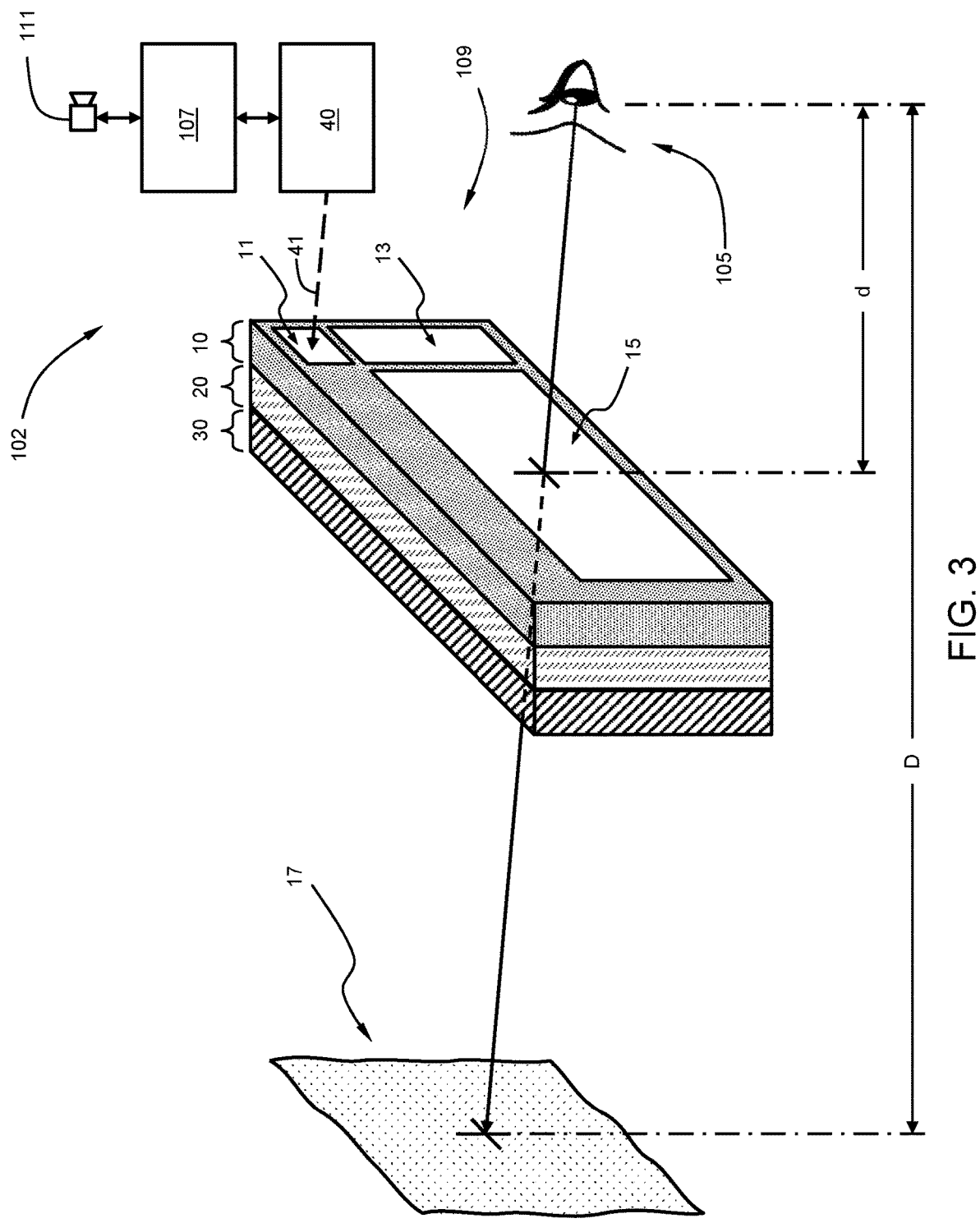
FIG. 3 illustrates an embodiment of a display unit of a display system, in accordance with the present disclosure.

With reference to FIG. 3, an embodiment of a display unit 109 of a display system 102 is illustrated. The display unit 109 may be arranged, for example, in place of a conventional windshield mounted rearview mirror as previously described. Thus, it is appreciated that the operator's eyes 105 are oriented in front of the display unit 109 at a distance "d" therefrom. The distance "d" between the operator's eyes 105 and the display unit 109 may be known by sensing, such as by an eye tracking system, or may be approximated or established in accordance with a calibrated value or setting. A virtual image plane 17 is located beyond the display unit 109 at a distance "D" from the operator's eyes 105. The distance "D" between the operator's eyes 105 and the virtual image plane 17 may be established in accordance with a calibrated value or setting, and may be adaptively adjusted as described further herein. In one embodiment, the distance "D" to the virtual image plane 17 may be greater than the distance "d" to the display. In another embodiment, the distance "D" to the virtual image plane 17 may be no less than a predetermined multiple of the distance "d" to the display. In another embodiment, the distance "D" to the virtual image plane 17 may be no less than about 1 meter. In another embodiment, the distance "D" to the virtual image plane 17 may be no less than about 2 meters. In another embodiment, the distance "D" to the virtual image plane 17 may be no less than the extent of the front end of the vehicle. In another embodiment, the distance "D" to the virtual image plane 17 may be automatically adapted, for example, to ambient light conditions, time of day, approaching vehicle headlights, or location of the sun relative to the direction of vehicle travel. In another embodiment, the distance "D" to the virtual image plane 17 may be automatically adapted to a measure or extent of dilation of the pupils of the operator's eyes 105. For example, it may be advantageous to extend the distance "D" to the virtual image plane 17 for dilated pupils. In another embodiment, the distance "D" to the virtual image plane 17 may be established in accordance with a calibrated value or an operator's recognition, setting or preferences, including one or more learned settings and preferences related to an operator's settings during various ambient and operational scenarios.

The display unit 109 may include a holographic projector 40 for generating a holographic image 41 based upon images provided to the holographic projector 40. In one embodiment, the holographic image 41 may be based upon images captured by the rear camera 111 and preprocessed by the controller 107 for holographic manipulation and generation by the holographic projector 40. The holographic projector 40 may receive images from the controller 107 and other information such as a setting for the virtual image plane 17, for example the distance "D" for the generated holographic image 41. The holographic projector may include red, green, and blue (R/G/B) coherent light source lasers, corresponding spatial light modulators and a combiner such as an X-cube or other lenses or prisms. A phase-only hologram may be encoded from the received image onto the spatial light modulators for the R/G/B laser light. The R/G/B light from the lasers is diffracted by the spatial light modulators encoded with the hologram, combined by the X-cube and then in-coupled into a pupil replicator 10. The holographic image 41 may therefore be encoded into phase only holograms having a virtual image plane 17 corresponding to a predetermined distance "D" from the operator's eyes. In another embodiment, the holographic image 41 may include computer generated graphics, for example, graphical and textual information such as speed, heading infotainment, navigation cues, etc. In another embodiment, the holographic image 41 may be based upon images captured by the rear camera 111 and include computer generated graphics. In one embodiment, the holographic image is optically coupled to the pupil replicator 10 at an input coupling grating 11 accepting light from the front of the display unit 109. The pupil replicator 10 may include holographic volume grating including orthogonal x-direction and y-direction gratings for expanding the viewing area (eyebox) of holographic image 41. For example, the pupil replicator 10 may provide the holographic image 41 to a y-direction pupil replication grating 13 from the input coupling grating 11 which in turn provides the holographic image 41 to a x-direction pupil replication grating 15. Once expanded, the replicated holographic image 41 exits the pupil replicator 10 of the display unit 109 and is projected toward an eyebox. The size of the eyebox will depend upon the performance dimensionality of the pupil replicator 10. However, when the operator's eyes are within the eyebox, the operator may view the complete holographic image 41 at the predetermined distance "D" to the virtual image plane 17. The presence of the operator's eyes within the eyebox may be used to determine whether the holographic mode is active.

In one embodiment, the display unit 109 may include a mirror 30 behind the pupil replicator 10 and a controllable absorptive shutter 20 between the pupil replicator 10 and the mirror 30. In such embodiments, the display unit 109 may include a first holographic mode and a second mirror mode.

The first holographic mode desirably includes blocking the reflection from the mirror 30 in favor of holographic image display. Thus, in a first holographic mode, the holographic projector 40 is enabled and reflection from the mirror 30 is blocked or attenuated by the controllable absorptive shutter 20 being placed into a light non-transmissive state. In a second mirror mode, the holographic projector 40 may be disabled and reflection from the mirror 30 allowed by the controllable absorptive shutter 20 being placed into a light transmissive state. In one embodiment the mirror 30 may be a metallic mirror. In another embodiment, the mirror 30 may be a broadband dielectric mirror. In other embodiments, the mirror may be fully or partially reflective by virtue of light transmission control through the controllable absorptive shutter 20, for example as a dimming "night" function either with or without the display unit 109 also operating in a holographic mode, for example for augmenting reflected images with computer generated holographic graphics appearing at the predetermined distance "D" to the virtual image plane 17.

Figure 4:
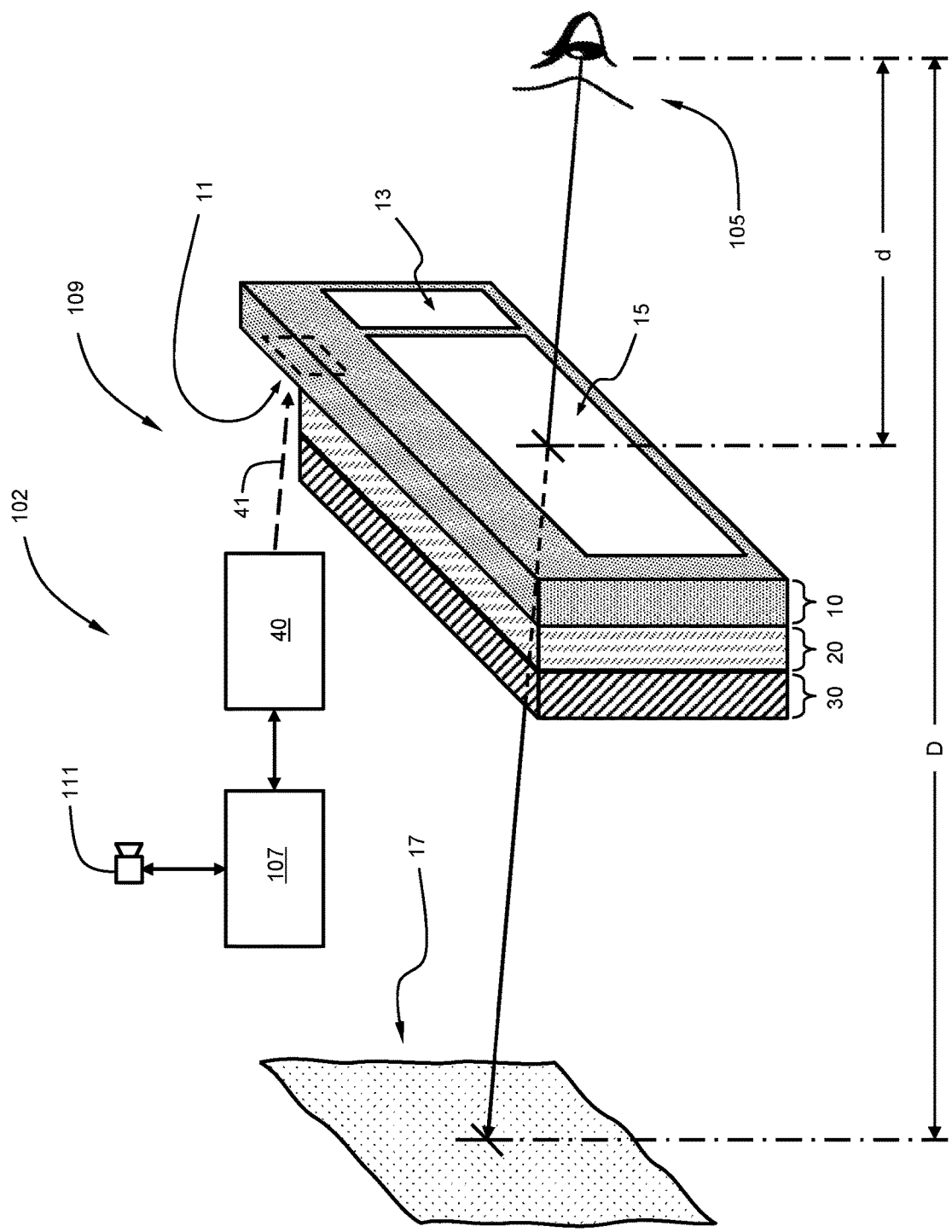
FIG. 4 illustrates an embodiment of a display unit of a display system, in accordance with the present disclosure.

FIG. 4 illustrates another embodiment of a display unit 109 of a display system 102 equivalent in functional respects to the embodiment of FIG. 3. The embodiment of FIG. 4, however, differs in that the holographic projector 40 is arranged at the back of the display unit 109 and the holographic image 41 is coupled to the pupil replicator 10 at an input coupling grating 11 accepting light from the back of the display unit 109.

Figure 5:
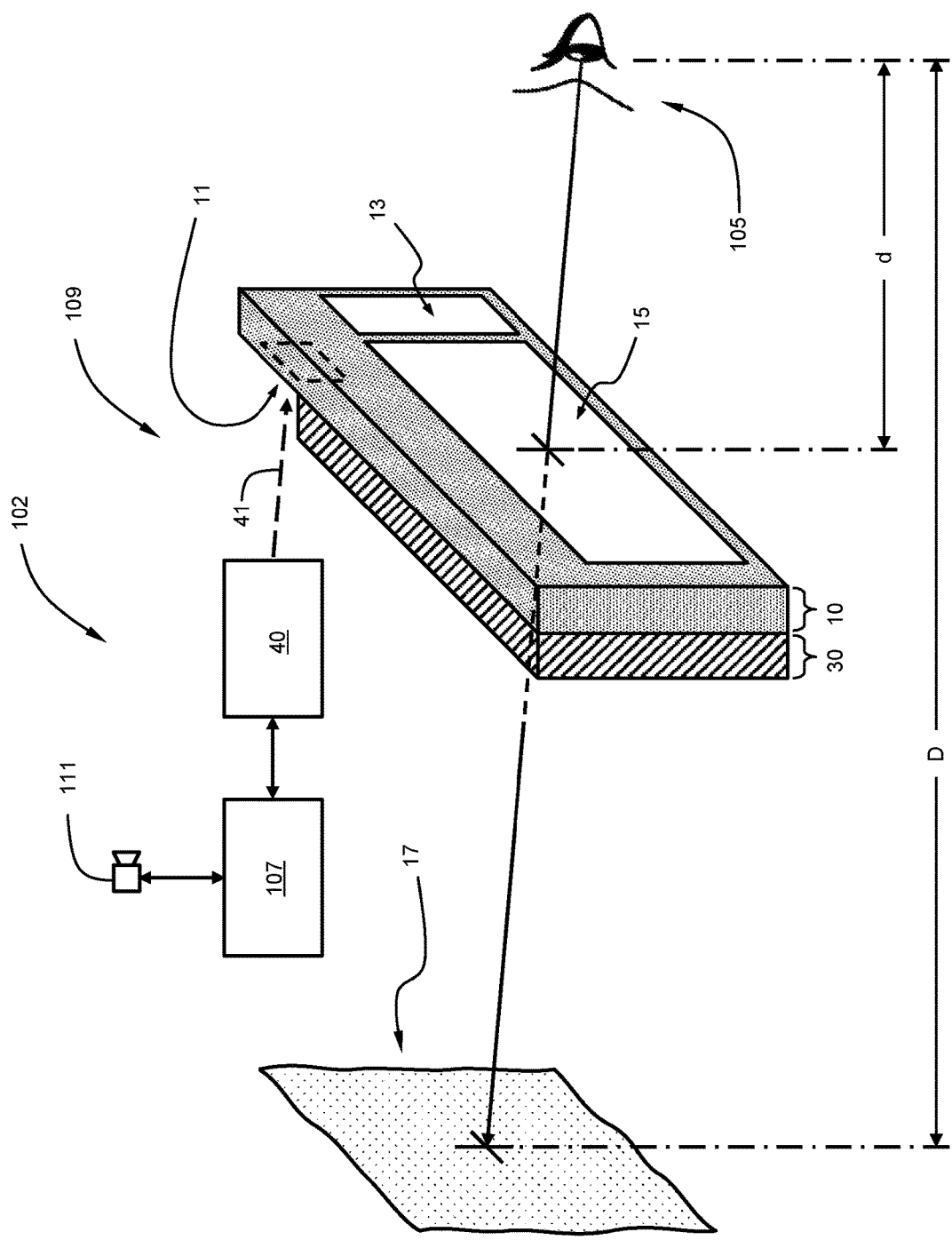
FIG. 5 illustrates an embodiment of a display unit of a display system, in accordance with the present disclosure.

FIG. 5 illustrates another embodiment of a display unit 109 of a display system 102. In this embodiment, the display unit 109 may include a mirror 30 behind the pupil replicator 10 as in the embodiments of FIGS. 3 and 4. However, the embodiment of this FIG. 5 does not include an intermediate absorptive shutter between the pupil replicator 10 and the mirror 30. This embodiment may be advantageously employed where the holographic projector 40 display intensity dominates the reflective properties of the mirror 30 or where holographic images 41 being displayed are supplemental to the reflected image, such as computer generated graphics, text or overlays such as speed, heading infotainment, navigation cues, etc.

Figure 6:
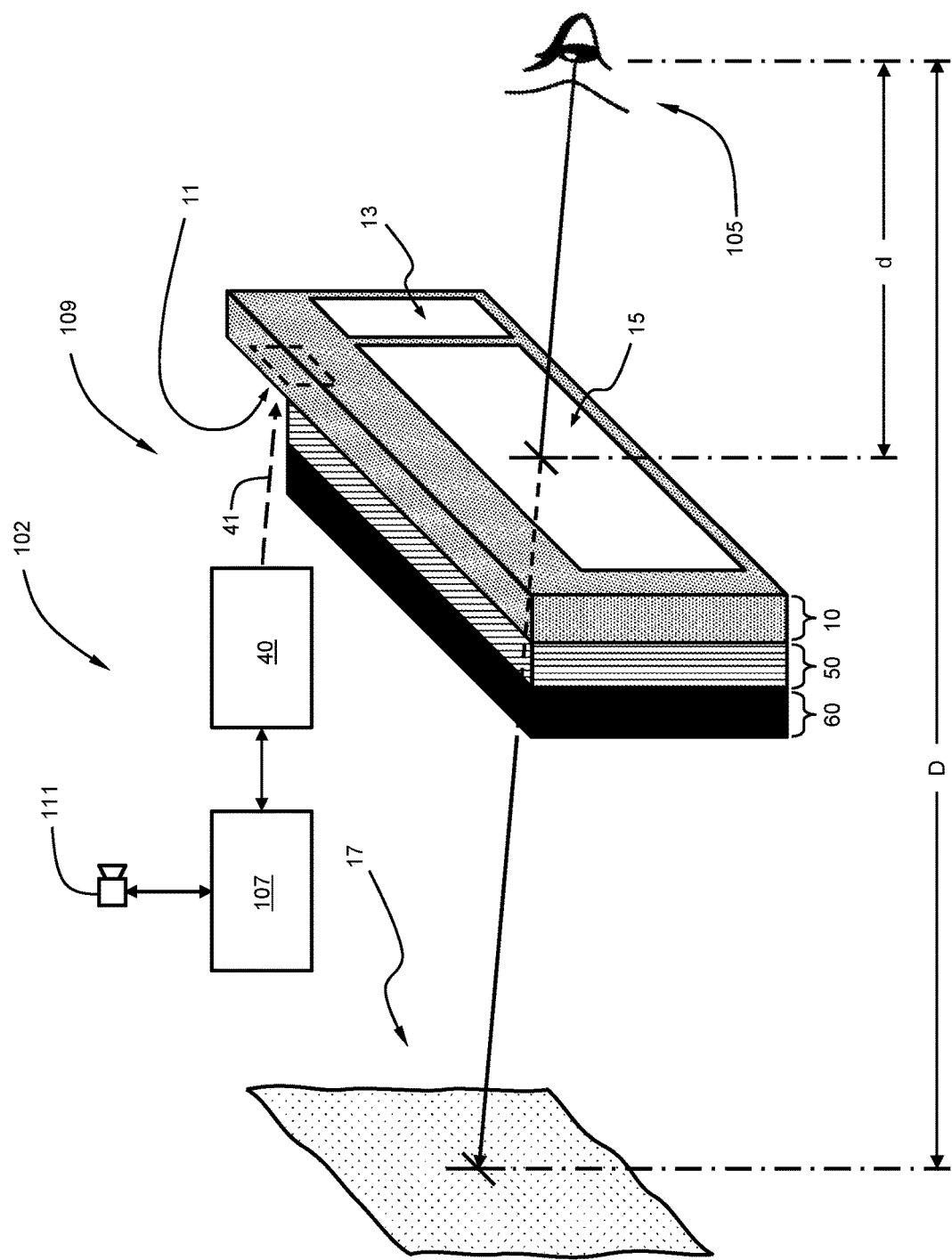
FIG. 6 illustrates an embodiment of a display unit of a display system, in accordance with the present disclosure.

FIG. 6 illustrates another embodiment of a display unit 109 of a display system 102. In the embodiment of FIG. 6, the display unit 109 may include a reversible electrochemical mirror (REM) 50 behind the pupil replicator 10. Additionally, in some embodiments, a light absorptive layer 60 may be behind the REM 50. In such embodiments, the display unit 109 may include a first holographic mode and a second mirror mode. The first holographic mode desirably includes enabling light transmission through the REM 50 in favor of holographic image display. Thus, in a first holographic mode, the holographic projector 40 is enabled and reflection from the REM 50 is disabled by being placed into a light transmissive state. Other transmissive/reflective mirror embodiments are possible and are not to be excluded or limited by the exemplary mentioned REM 50 herein. In a second mirror mode, the holographic projector 40 may be disabled and reflection from the REM 50 allowed by placing the REM 50 into a light reflective state. In one embodiment, the REM 50 may be fully or partially reflective by virtue of light transmission control through the REM 50, for example as a dimming "night" function either with or without the display unit 109 also operating in a holographic mode, for example for augmenting reflected images with computer generated holographic graphics appearing at the predetermined distance "D" to the virtual image plane 17.

Figure 7:
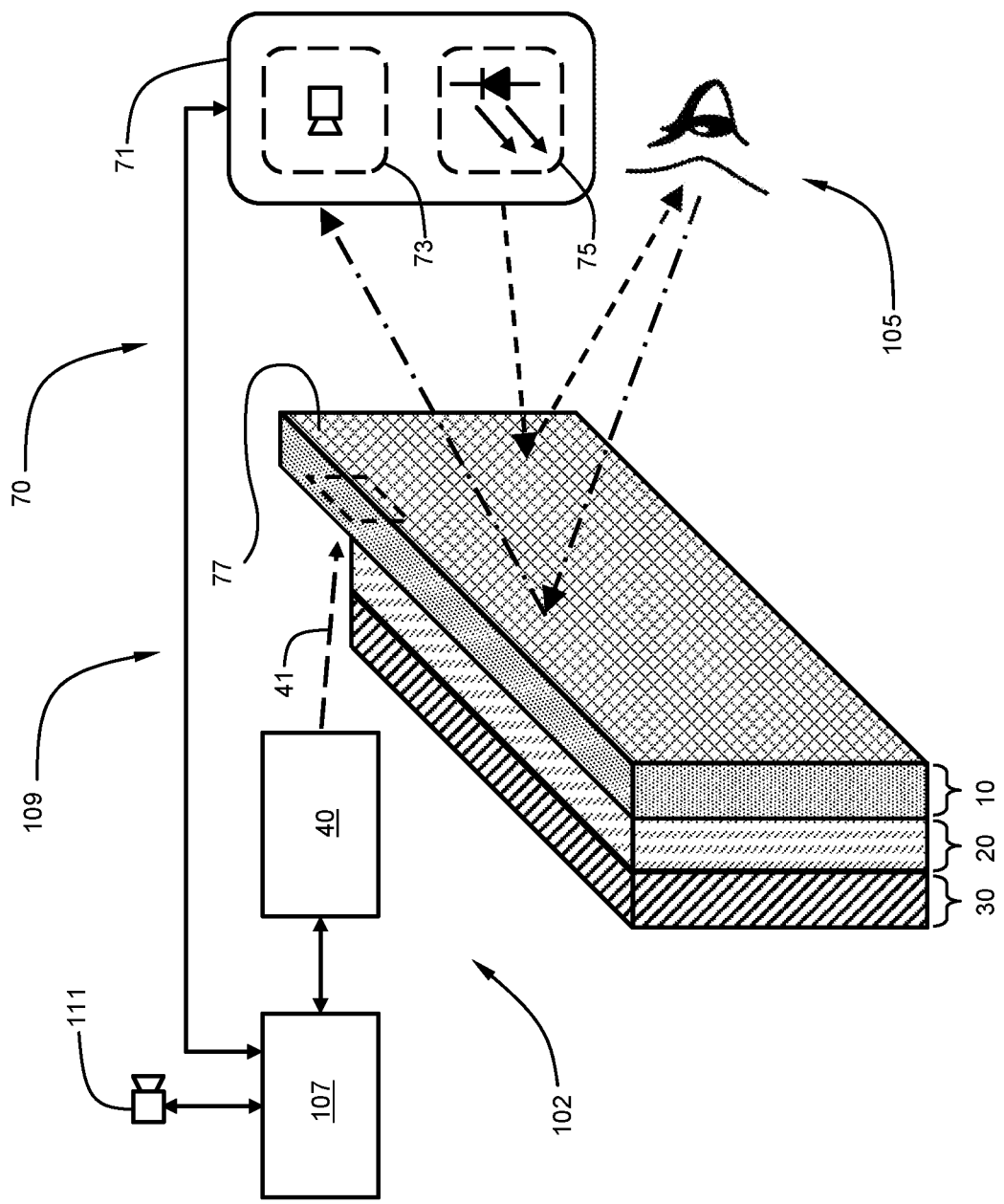
FIG. 7 illustrates an embodiment of a display unit of a display system including eye tracking, in accordance with the present disclosure.

FIG. 7 illustrates another embodiment of a display unit 109 of a display system 102. In the embodiment of FIG. 7, certain features of the pupil replicator 10 are not illustrated for clarity. The embodiment of FIG. 7 is illustrated including a pupil replicator 10, a controllable absorptive shutter 20, and a mirror 30 arranged as in the embodiments of FIGS. 3 and 4. It is understood that the features first described below in conjunction with the embodiment of FIG. 7 may be employed with any other of the embodiments illustrated in any of the FIGS. herein and is not limited to the present exemplary arrangement. The embodiment of FIG. 7 includes eye tracking of the operator's eyes 105 for determining whether the operator's eyes are occupying the eye box. An eye tracking system 70 may include an eye tracking unit 71 including a light source 75 and a camera 73. The pupil replicator 10 may include a reflective layer 77. A reflective layer 77 as used herein means a layer, coating, film or similar. The light source 75 may preferably be an infrared (IR) or near IR light source such as a light emitting diode (LED) as illustrated. Reference to IR herein includes IR and near IR. The reflective layer 77 may be selectively reflective, for example reflecting IR or near IR wavelengths and otherwise generally light transmissive. The eye tracking unit 71 (or controller 107) may determine the operator's eye positions in three-dimensional space and determine whether the operator's eyes are within a predetermined eye box region of the display unit 109. The eye tracking system 70 may illuminate at least the eyebox by reflecting the light from the light source 75 off the reflective layer 77. Light received by the operator's eyes may be reflected by the corneas and received back at the camera 73 through the reflective layer 77. The captured images of the eye by camera 73 may be used to determine whether the operator's eyes are within the eyebox. The eye tracking unit 71 (or controller 107) may include known image processing algorithms (including Artificial Intelligence (AI), and determine whether the operator's eyes are within the eyebox. The presence of the operator's eyes within the eyebox may be used to determine whether the holographic mode is enabled. Enabling the holographic mode may include receiving at the controller 107 information from the eye tracking unit indicating that the operator's eyes are within the eyebox, and controlling the holographic projector 40 to generate a holographic image 41. The eye tracking unit 71, in determining the operator's eye positions in three-dimensional space, may also determine the distance from the operator's eyes to the display unit 109. The eye tracking unit 71 may also determine pupil size and status (e.g., dilated or constricted).

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A display system for a vehicle, comprising:
a display unit mounted to a vehicle and selectively operable in a first mode as a holographic display and in a second mode as a mirror, the display unit comprising a pupil replicator having an input coupling grating, and a holographic projector receiving an image and generating a holographic image based on the image, the holographic image in-coupled into the pupil replicator at the input coupling grating and through a holographic volume grating including first and second orthogonal gratings; and
a controller providing the image and a virtual image plane setting to the holographic projector for generating the holographic image when the display unit is operating in the first mode as the holographic display, the display unit displaying the holographic image at the virtual image plane setting, the virtual image plane setting being greater than a distance between an operator's eyes and the display unit.

2. The display system of claim 1, further comprising a rear facing camera, wherein the provided image comprises an image from the rear facing camera.

3. The display system of claim 1, wherein the provided image comprises a computer generated image.

4. The display system of claim 2, wherein the provided image further comprises a computer generated image.

5. The display system of claim 1, wherein only one of the first mode and the second mode is operable at a time.

6. The display system of claim 1, wherein both the first mode and the second mode may be simultaneously operable.

7. The display system of claim 1, further comprising an eye tracking system including a selectively infrared reflective layer on the pupil replicator.

8. The display system of claim 7, wherein the eye tracking system determines a position of the operator's eyes and enables operation of the display unit in the first mode as the holographic display when the operator's eyes are within an eyebox.

9. The display system of claim 1, further comprising a mirror behind the pupil replicator.

10. The display system of claim 9, wherein the mirror comprises a reversible electrochromic mirror.

11. A display system for a vehicle comprising:
a display unit comprising a pupil replicator, a mirror behind the pupil replicator and a controllable absorptive shutter between the pupil replicator and the mirror, the display unit mounted to a vehicle and selectively operable in a first mode as a holographic display and in a second mode as a mirror; and
a controller providing an image and a virtual image plane setting to the display unit when the display unit is operating in the first mode as the holographic display, the display unit configured to generate and display a holographic image at the virtual image plane setting based on the provided image, the virtual image plane setting being greater than a distance between an operator's eyes and the display unit.

12. The display system of claim 1, wherein the virtual image plane setting is adaptively set based upon a dilation of an operator's eyes.

13. The display system of claim 1, wherein the virtual image plane setting is no less than 1 meter.

14. A display system for a vehicle, comprising:
a display unit mounted to a vehicle and selectively operable in a first mode as a holographic display and in a second mode as a mirror, the display unit including a pupil replicator, a holographic projector optically coupled to the pupil replicator, a mirror behind the pupil replicator, and a controllable absorptive shutter between the pupil replicator and the mirror;
a rear facing camera capturing an image;
an eye tracking system, including a selectively infrared reflective layer on the pupil replicator, determining a position of an operator's eyes and enabling operation of the display unit in the first mode as the holographic display when the operator's eyes are within an eyebox; and
the holographic projector receiving the image captured by the rear facing camera when the display unit is operating in the first mode as the holographic display, generating a holographic image based on the captured image, coupling the holographic image to the pupil replicator to display the holographic image at a predetermined virtual image plane setting, the virtual image plane setting being greater than a distance between an operator's eyes and the display unit.

15. The display system of claim 14, wherein the mirror comprises a reversible electrochromic mirror.

16. The display system of claim 14, wherein the eye tracking system determines a dilation of the operator's eyes, and the virtual image plane setting is adaptively set based upon the dilation.

17. A method for displaying information in a vehicle, comprising:
providing a display unit comprising a pupil replicator, a mirror behind the pupil replicator and a controllable absorptive shutter between the pupil replicator and the mirror, the display unit mounted to the vehicle and selectively operable in a first mode as a holographic display and in a second mode as a mirror;
when the display unit is operating in the first mode as the holographic display:
placing the controllable absorptive shutter in a light non-transmissive state;
providing an image to the display unit;
generating, by the display unit, a holographic image based on the provided image; and
displaying, at the display unit, the holographic image at a predetermined virtual image plane setting, the virtual image plane setting being greater than a distance between an operator's eyes and the display unit; and
when the display unit is operating in the second mode as a mirror, placing the controllable absorptive shutter in a light transmissive state.

18. The method of claim 17, further comprising enabling the display unit to operate in the first mode as the holographic display when the operator's eyes are detected within an eyebox.

19. The display system of claim 9, further comprising a controllable absorptive shutter between the pupil replicator and the mirror.

20. The display system of claim 11, wherein both the first mode and the second mode may be simultaneously operable.

* * * * *